(12) United States Patent
Sailing

(10) Patent No.: US 6,813,965 B2
(45) Date of Patent: Nov. 9, 2004

(54) HSK SPINDLE TENSION TESTING KIT

(76) Inventor: Jerome D. Sailing, 20 H St. SE., Auburn, WA (US) 98002-5609

( * ) Notice: Subject to any disclaimer, the term of this patent is extended or adjusted under 35 U.S.C. 154(b) by 0 days.

(21) Appl. No.: 10/389,531

(22) Filed: Mar. 14, 2003

(65) Prior Publication Data
US 2003/0180110 A1 Sep. 25, 2003

Related U.S. Application Data

(63) Continuation-in-part of application No. 10/062,884, filed on Jan. 30, 2002, now Pat. No. 6,533,507.

(51) Int. Cl.[7] .............................. B01N 3/08; B23C 9/00
(52) U.S. Cl. .................. 73/862.393; 409/131; 409/233; 73/831; 73/832; 73/862.49
(58) Field of Search ................................ 409/131, 233, 409/232; 73/856, 862.393, 831, 832, 862.392, 862.49, 862.542; 29/283

(56) References Cited

U.S. PATENT DOCUMENTS

| | | |
|---|---|---|
| 4,944,643 A | 7/1990 | Lehmkuhl |
| 5,342,155 A | 8/1994 | Harroun |
| 5,346,344 A * | 9/1994 | Kress et al. ................. 409/234 |
| 5,741,981 A | 4/1998 | Ling et al. |
| 5,865,578 A * | 2/1999 | Benedikter et al. ......... 409/233 |
| 6,453,751 B1 | 9/2002 | Schlagenhauf |
| 6,533,507 B2 | 3/2003 | Sailing |

FOREIGN PATENT DOCUMENTS

| | | | |
|---|---|---|---|
| DE | 019906803 A1 | * | 8/2000 |
| EP | 0356636 | | 6/1989 |
| JP | 10-291105 A | * | 11/1998 |

* cited by examiner

*Primary Examiner*—Erica Cadugan
(74) *Attorney, Agent, or Firm*—Dean A. Craine

(57) ABSTRACT

A HSK spindle tension testing kit for measuring the force exerted by the drawbar assembly on the spindle on a CNC machine. The kit includes an upper frame member, a clevis, a pressure jack, a guide piece, a grip-housing, and a transfer rod. The guide piece is aligned over the grip-housing which is placed inside the front cavity on a HSK spindle. During operation, the drawbar assembly engages the grip housing. The transfer rod is threadingly connected at one end to the grip-housing, extends through the guide piece and connects to the shank on the upper frame member to hold the pieces together. During use, the pressure jack and clevis are then used to apply a pulling force on the transfer rod and to test the amount of force exerted by the drawbar assembly on the grip-housing.

12 Claims, 4 Drawing Sheets

US 6,813,965 B2

HSK SPINDLE TENSION TESTING KIT

This is a continuation in part of U.S. patent application Ser. No. 10/062,884, filed Jan. 30, 2002, now U.S. Pat. No. 6,533,507.

BACKGROUND OF THE INVENTION

1. Field of the Invention

The present invention relates generally to devices for measuring the force exerted by the drawbar assembly of the spindle of a CNC machine or other similar machine that uses a drawbar for retaining a tooling arbor.

2. Description of the Related Art

Spindles on CNC machines are commonly used for manufacturing gear boxes, or a metal work piece. Such machines typically use a specific type of spindle that includes a drawbar assembly and a coupler which securely holds the tool holder. Each tool holder includes a conical-shaped body which is placed inside a complementary-shaped receiving space formed in the spindle assembly. Attached to the tip of the tool holder is a pull stud which engages a complementary-shaped slot formed on a coupler located inside the receiving space assembly.

Another type of spindle used with CNC machines uses a hollow-shank, taper anchor (hereinafter called a HSK arbor) which interfaces with the drawbar mechanism used with the HSK spindle. A HSK spindle drawbar includes a set of fingers which are forced outward by the drawbar mechanism to engage the inside rim formed on the arbor. The drawbar mechanism is then pulled inward to retain the HSK arbor within the spindle.

Various claims are made as to the benefits of each type of arbor. Generally, the consensus among machine operators is that HSK arbors and spindles are superior for high-speed machining (spindle rotations of 15,000 to 50,000 RPM) while long taper arbors and spindles are superior for low speed machinery (below 10,000 RPM).

SUMMARY OF THE INVENTION

It is an object of the present invention to provide a tension testing kit for measuring the holding force on an HSK arbor and spindle.

The testing kit includes a force exerting means similar to the structures disclosed in Applicant's prior patent application, which is incorporated herein. The kit also includes a guide piece, a grip-housing, and a transfer rod. During assembly, the HSK arbor is removed from the spindle. The transfer rod is selected and longitudinally aligned and connected to the internal threads on the grip-housing. The guide piece is then selected and longitudinally aligned over the grip-housing and the distal end of the transfer rod that extends from the grip-housing. In the preferred embodiment, the force exerting means is an upper frame member, a clevis, and a pressure jack. During assembly, the shank of the upper frame member is inserted into the bore formed on the guide piece and threadingly connected to the proximal end of the transfer rod. The pressure jack is then inserted inside the upper frame member and the clevis is positioned over the upper frame member's lower horizontal member. As a pulling force is applied to the transfer rod via the drawbar assembly, the upper frame member is then pulled towards the clevis thereby applying pressure to the pressure jack. The interior shape of the front cavity formed inside the guide piece is identical to the geometry of the HSK arbor except that the lower conical section is slightly smaller in diameter which allows the grip-housing to be pulled towards the spindle when the drawbar assembly is activated. Before the lower conical section of the grip-housing contacts the surfaces of the front cavity, the gauge attached to the pressure jack measures the tension force to determine if the drawbar assembly holding force on the grip housing is within acceptable operating specifications.

DESCRIPTION OF THE PREFERRED EMBODIMENT(S)

Figure 1:
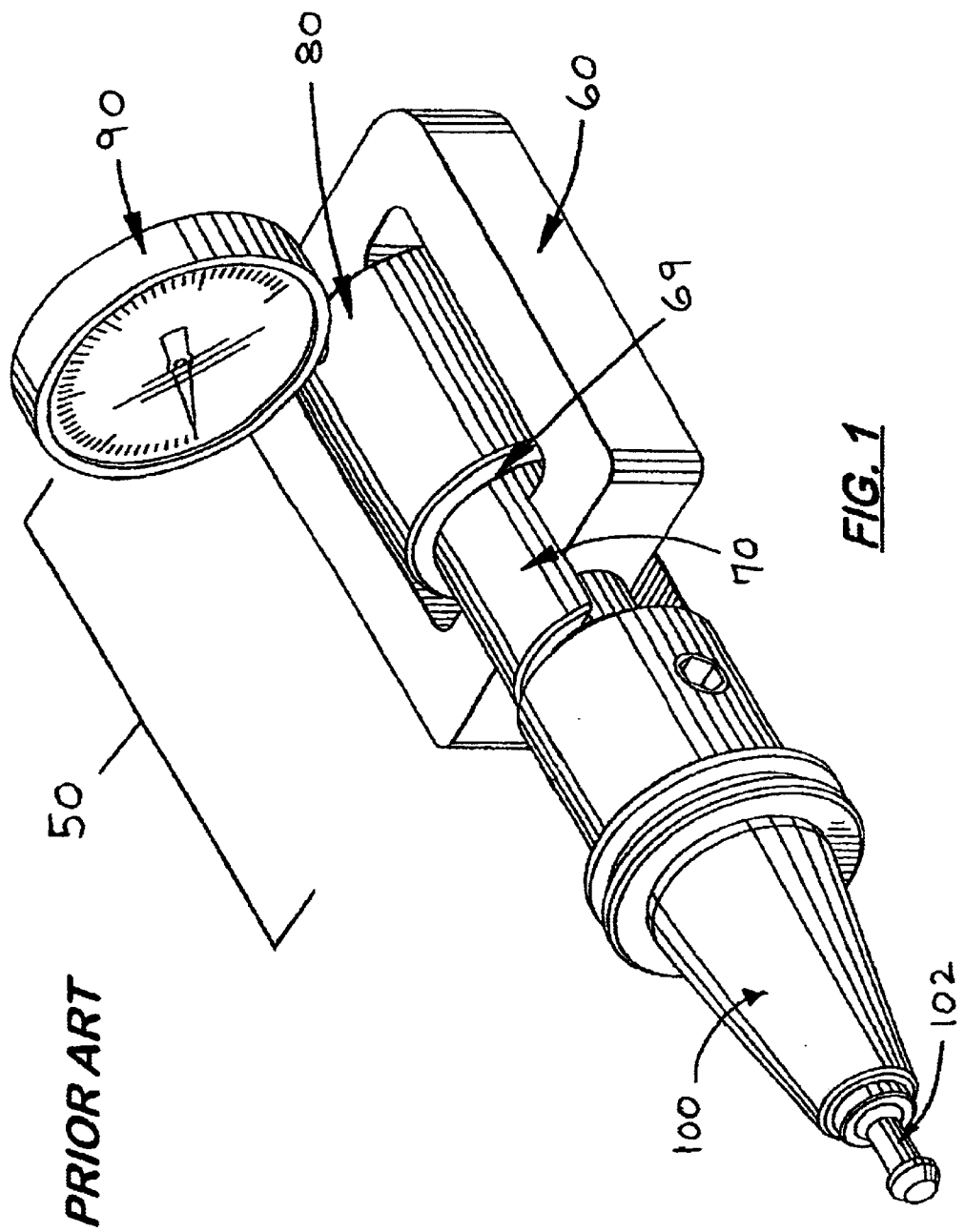
FIG. 1 is a perspective view of the spindle tool holder tension testing kit disclosed in the prior art.

FIG. 1 shows a spindle tool holder tension testing kit disclosed in U.S. patent application Ser. No. 10/062,884, now U.S. Pat. No. 6,533,507, which uses a force exerting means 50 comprising an upper frame member 60, a hydraulic pressure jack 80 with a moving plunger 69 and a pressure gauge 90 and a clevis 70. During use, the force exerting means applies a pulling force on a transfer rod (not shown) located inside the tool holder 100. The end of the transfer rod is attached to a modified pull stud 102 which partially extends from the distal end of the tool holder 100. The pulling force on the transfer rod is used to test the holding force of a conical-shaped spindle on the modified pull stud 102 which is measured on the pressure gauge 90.

Figure 2:
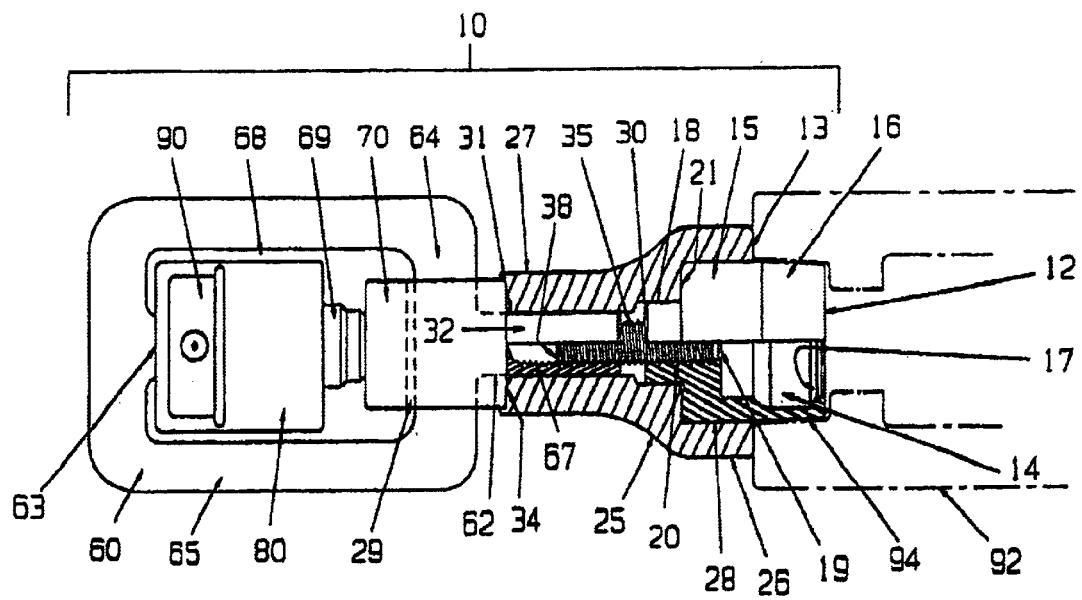
FIG. 2 is a sectional side elevational view of the HSK spindle tension testing kit disclosed herein.
Figure 3A:
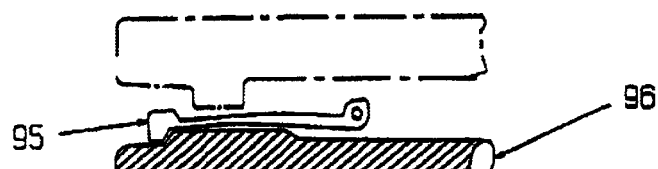
FIGS. 3A and 3B are sectional, side elevational views of the HSK spindle and drawbar mechanism showing the movement of the drawbar mechanism.

FIGS. 2–3 show the HSK spindle tension kit 10 disclosed herein which uses the same upper frame member 60, pressure jack 80, and clevis 70. The kit 10, however, also includes a grip-housing 12, the guide piece 25, and replacement transfer rod 35. The purpose of the kit 10 is to measure the amount of holding force on a HSK arbor by the drawbar mechanism 96 on a HSK spindle 92 as shown in FIG. 3A.

During use of the kit 10, the HSK arbor used with a HSK spindle 92 is replaced with the grip-housing 12, as shown in FIG. 2. The grip housing 12 is aligned on the spindle 92 so that its tapered end section 16 is inserted into the front cavity 94. The grip-housing 12 is a cylindrical-shaped structure which is a uniform diameter middle section 15 and a tapered, conical-shaped end section 16 and a cylindrical-shaped neck 18 opposite the end section 16. Formed inside the neck 18 is a threaded bore 20, and a hexagonal-shaped inside opening 19. Formed inside the middle and end sections 15, 16, respectively, is a cylindrical-shaped internal cavity 14 with an inward protruding lip 17 formed around its opening.

Figure 3B:
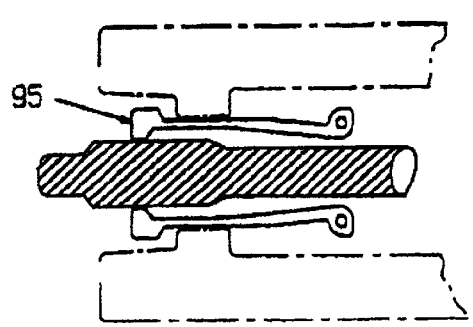

During use, the protruding lip 17 is engaged by the moving fingers 95 on the HSK spindle 92 as shown in FIGS. 3A and 3B. During operation, the drawbar assembly 96 moves longitudinally through the front cavity 94 which causes the fingers 95 to move outward and engage or disengage the protruding lip 17 and hold or release the grip-housing 12, respectively.

Figure 5:
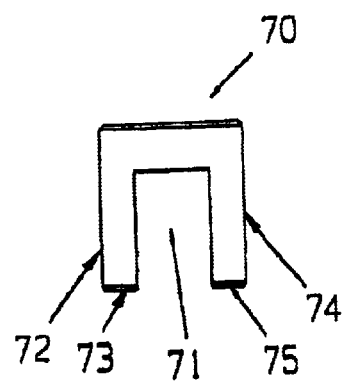
FIG. 5 is a front elevational view of the clevis.
Figure 6:
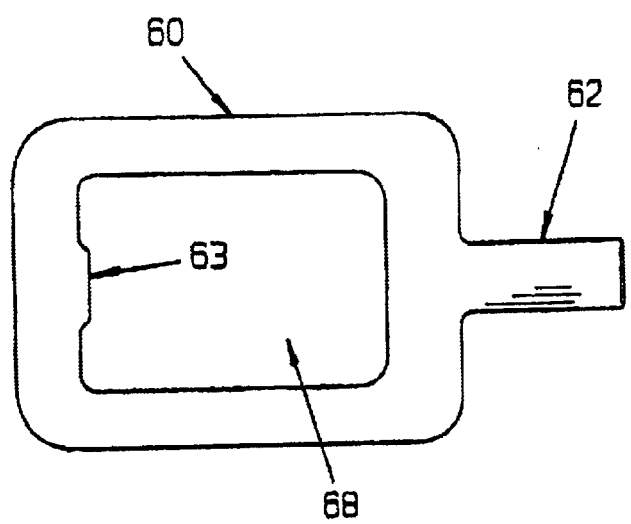
FIG. 6 is a top plan view of the upper frame member.
Figure 7:
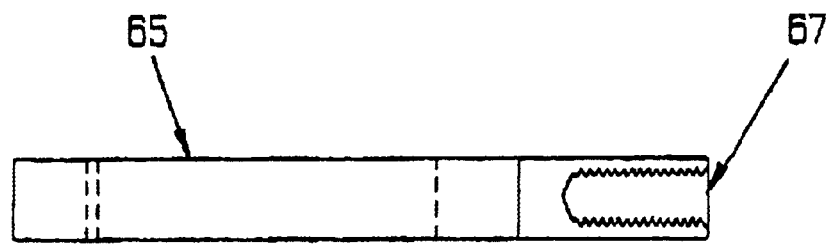
FIG. 7 is a side elevational view of the frame piece.

As also shown in FIG. 2, aligned longitudinally over the grip-housing 12 is a guide piece 25. The guide piece 25 includes a wide, lower cylindrical section 26 and an upper, narrow neck section 27. Formed inside the lower cylindrical section 26 is a large cylindrical-shaped cavity 28 designed to receive the neck 18 and middle section 15 of the grip-housing 12. Also, formed adjacent to the large cavity 28 and inside the neck section 27 is a cylindrical-shaped narrow cavity 30 designed to slidingly receive the neck 18 of the grip-housing 12. Formed longitudinally and extending from the distal end 31 of the guide piece 25 to the narrow cavity 30 is a bore 32 with smooth side walls. Formed on the distal end 31 of the guide piece 25 is an optional circular, reset counter sunk surface 34 that receives the distal ends 73, 75 of the arms 72, 74, respectively, of the clevis 70, as shown in FIG. 5 and discussed further below.

During use, a threaded transfer rod 35 is longitudinally aligned with the bore 32. The distal end of the transfer rod 35 is threadingly connected to the threaded bore 20 on the grip-housing 12. The proximal end of the transfer rod 35 is threadingly connected to the shank 62 on the upper frame member 60. The upper frame member 60 has a flat, rectangular-shaped body 65 and a perpendicularly aligned cylindrical neck 62 extending therefrom. Formed inside the shank 62 is a threaded bore 67 which, as stated above, attaches to the proximal end 38 of the transfer rod 35. The upper frame member 60 includes a central opening 68 in which the main body 82 of the pressure jack 80 is placed. Formed on the inside surface of the upper horizontal member is a raised boss surface 63.

Disposed over the frame's lower horizontal member 64 is a U-shaped clevis 70. The clevis 70 is cylindrical and includes a U-shaped cutout 71 as shown in FIG. 5 with sufficient width and length to allow the clevis 70 to slide freely over the lower horizontal member 64. The length of the shank 62 on the upper frame member 60 and the lengths of the arms 72, 74 on the clevis 70 are sufficient so that the distal ends 73, 75 of the arms 72, 74, respectively, press against the counter-sunk surface 34 formed on the distal end of the guide piece 25.

Figure 4:
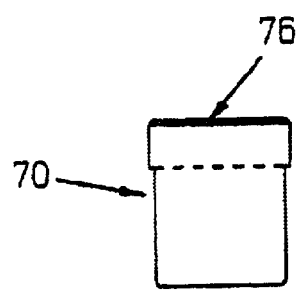
FIG. 4 is a sectional, side elevational view of the clevis support.
Figure 8:
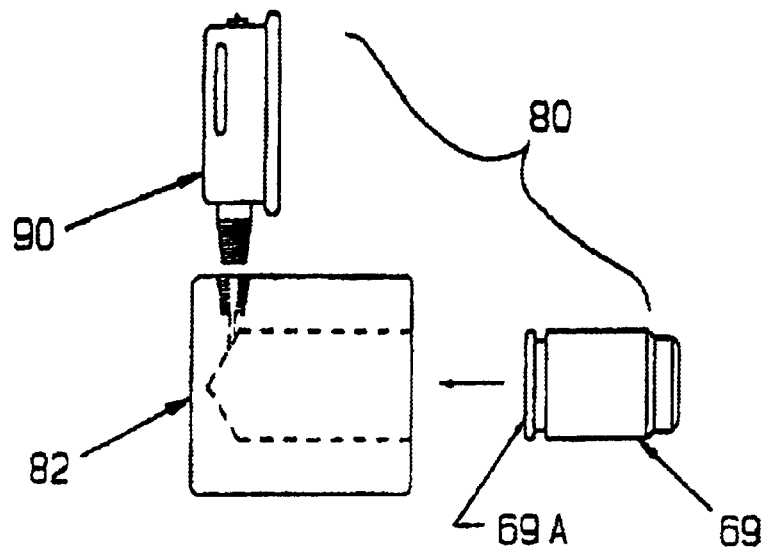
FIG. 8 is a side elevational view of the pressure gauge assembly.

In the preferred embodiment shown in FIG. 2 and FIG. 8, the pressure jack 80 is hydraulically controlled and includes a main body 82 and an adjustable plunger 69 extending therefrom. Attached to the main body 82 is a pressure gauge 90 capable of measuring and displaying pressure in 100 lbs per square inch units. In the preferred embodiment, the area of the contact surface 69A of the plunger 69 is one square inch so that the operator may easily measure the tension force in units commonly used by spindle drawbar manufacturers. During operation, the pressure jack 80 selectively exerts pressure against the raised boss surface 63 on the upper frame member 60 and the upper surface 76 of the clevis 70 as shown in FIG. 4.

During assembly, the shank 62 of the upper frame member 60 is inserted into the bore 32 formed on the guide piece 25. The clevis 70 is saddled over the lower horizontal member 64 so that the distal ends 73, 75 on the clevis' arms 72, 74, respectively, contact the countersunk surface 34 on the guide piece 25. The pressure jack 80 is aligned inside the central opening 68 on the upper frame member 60 so that the upper surface of the main body 82 contacts the raised boss surface 63 and the face of the plunger 69 contacts the clevis 70. A small gap exists between the under surface of the clevis 70 and the upper frame member 60 to allow the pressure gauge 90 and main body 82 to be adjusted into a symmetrical position within the upper frame member 60, by hand. At this point, the grip-housing 12 is inserted into the large cavity 28 formed in the guide piece 25 and the transfer rod 35 is then threadingly connected to the neck 18 on the grip-housing 12. The grip-housing 12 is radially located in the guide piece 25 with ample clearance to avoid interference. The grip-housing 12 is rotated clockwise on the transfer rod 35 with a hex wrench installed at the hexagonal-shaped inner opening 19. As the transfer rod 35 begins to engage the threads on the bore 67 on the upper frame member 60, the grip-housing 12 stops against the internal shoulder of the guide piece 25 at 21 and begins to register pressure on the pressure gauge 90. The tightening process is continued until approximately 50% of the expected desired pressure is displayed on the pressure gauge 90.

The assembly 5 is now ready to be inserted into the HSK spindle 92 of the machine to be tested.

When the machine's drawbar mechanism 96 is retracted, as shown in FIG. 3A, the grip housing 12 is inserted into the tapered, recessed, front cavity 94 of the HSK spindle 92 until the guide piece 25 contacts the outer face 13. A slight amount of radial looseness may be felt at this time since there exists a small amount of clearance between the conical surface 16 of the grip-housing 12 and the HSK spindle 92 at the grip housing's outer tapered surface. There is also clearance between the inside surface of the dog-drivers and the end of the grip-housing 12. The grip-housing 12 does not extend into the HSK spindle cavity 94 as far as with a standard tool holder. And the tapered, conical surface of the grip-housing 12 does not make binding contact with the HSK spindle 92 at 94 as is usual with standard tool holders, but instead rests and is supported by and obtains its axial location reference from the outer face 13 of the HSK spindle 92.

However, the internal cavity 14 and tapered drawbar finger nesting surface is identical to a standard tool holder, which allows the drawbar mechanism 96 to apply axial force to the protruding lip 17 located on the grip-housing 12. That force is then transferred from the grip-housing 12 thru the transfer rod 35 into the threaded shank 62 of the upper frame member 60. The pressure jack 80 measure the force thru the two legs 72, 74 of the clevis 70. The clevis 70 exerts a force back into the guide piece 25 where it resists and prevents axial movement by its mating contact with the face 13 of the HSK spindle 92.

During operation, the drawbar mechanism 96 applies an axial force to the protruding lip 17 located on the grip-housing 12. That force is then transferred from the grip-housing 12 through the transfer rod 35 into the threaded shank 62 of the upper frame member 60. The pressure jack 80 has been previously adjusted to apply a known force through the two legs 72, 74 of the clevis 70. The clevis 70 then exerts a force back into the guide piece 25 where it resists and prevents axial movement by its mating contact with the face 13 of the HSK spindle 92. The incidence of pressure is easily read in 100 lbs. per square inch units since the plunger area 69 equals one square inch.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A tension testing kit for testing the holding force of a drawbar assembly on a HSK spindle, comprising:
    a. a grip-housing capable of connecting to the HSK spindle, said grip-housing having a longitudinally aligned threaded bore and opposite distal and proximal ends, said distal end including a protruding lip that can be selectively engaged by the drawbar assembly on the HSK spindle to hold said grip-housing on the HSK spindle;
    b. a guide piece longitudinally aligned over said grip-housing, said guide piece including an internal cavity that receives said grip-housing, said guide piece including a bore longitudinally aligned with said threaded bore on said grip-housing, said guide piece including an upper support surface;
    c. an upper frame member disposed over said guide piece;
    d. a transfer rod used to threadingly connect said grip-housing to said upper frame member;
    e. a clevis disposed between said upper frame member and extending to said support surface on said guide piece;
    f. a force-measuring means disposed between said clevis and said upper frame member used to measure the amount of pulling force exerted on said grip-housing by the drawbar assembly.

2. The tension testing kit as recited in claim 1, wherein said force-measuring means includes a pressure jack.

3. The tension testing kit as recited in claim 2, wherein said pressure jack includes a pressure gauge to measure the amount of pulling force exerted on said grip-housing.

4. The tension testing kit as recited in claim 3, wherein said pressure gauge is calibrated to indicate the amount of force exerted on one square inch of surface area.

5. The tension testing kit as recited in claim 4, wherein said pressure jack includes a plunger with a contact surface area of one square inch.

6. A tension testing kit for testing the holding force of a drawbar assembly on a HSK spindle, comprising:
    a. a grip-housing capable of being selectively attached to the HSK spindle, said grip-housing having a longitudinally aligned threaded bore and opposite distal and proximal ends, said distal end including a protruding lip that can be engaged by the drawbar assembly on the HSK spindle;
    b. a guide piece longitudinally aligned with said grip-housing, said guide piece including an internal cavity that receives said grip-housing, said guide piece including a bore that is longitudinally aligned with said threaded bore on said grip-housing, said guide piece including a support surface;
    c. a transfer rod longitudinally aligned with said bores on said grip-housing and said guide piece, said transfer rod being threadingly connected to said threaded bore on said grip-housing;
    d. an upper frame member attached to an end of said transfer rod opposite the end attached to said grip-housing, said upper frame member including a lower horizontal member, an upper horizontal member and an open space formed there between;
    e. a clevis disposed over said lower horizontal member on said upper frame member, said clevis having legs sufficient in length to press against said support surface on said guide piece; and,
    f. a pressure jack disposed inside said open space on said upper frame member, said pressure jack including a gauge for measuring the amount of force exerted by said clevis on said pressure jack.

7. The tension testing kit as recited in claim 6, wherein said pressure gauge is calibrated to indicate the amount of force exerted on one square inch of surface area.

8. The tension testing kit as recited in claim 7, wherein said pressure jack includes a plunger with a contact surface area of one square inch.

9. A method for testing the holding force on a drawbar assembly on a HSK spindle, comprising the following steps:
    a. selecting a spindle testing kit which includes a grip-housing, a guide piece, a transfer rod, a force-exerting means including an upper frame member and a clevis disposed between said upper frame member and extending to a support surface on said guide piece, and a force-measuring means, said transfer rod extending through the guide piece and connecting to said force-exerting means, said force-exerting means being attached to a first end of the transfer rod, and a force-measuring means coupled to said force-exerting means;
    b. assembling said grip-housing, said guide piece, said transfer rod, said force-exerting means and said force-measuring means to create a testing assembly;
    c. inserting said grip-housing into the front cavity of the HSK spindle to engage the drawbar assembly located therein;
    d. activating said drawbar assembly alone a longitudinal axis to hold said grip-housing inside said front cavity; and,
    e. measuring the amount of force exerted by said drawbar assembly using said force-measuring means.

10. The method as recited in claim 9, wherein said force-exerting means further includes a pressure jack, said upper frame member being attached to a second end on said transfer rod, said upper frame member having parallel, upper and lower members that are transversely aligned with respect to the longitudinal axis and a central opening formed by the upper and lower members, said clevis being located inside said central opening and disposed over said lower member, said clevis being sufficient in length to press against said guide piece when disposed over said lower member, said pressure jack being disposed between said clevis and said upper frame member and selectively operated to exert a pulling force on said transfer rod.

11. The method as recited in claim 9, wherein said force-measuring means is a pressure gauge coupled to said force-exerting means to measure the amount of pulling force exerted on said transfer rod.

12. The method as recited in claim 11, wherein said pressure gauge is calibrated to indicate the amount of force exerted on one square inch surface area.

* * * * *